United States Patent
Roberts et al.

(10) Patent No.: US 8,954,018 B2
(45) Date of Patent: Feb. 10, 2015

(54) TUNABLE WIDEBAND DISTRIBUTION CIRCUIT

(75) Inventors: Curtiss Roberts, Chandler, AZ (US); Rizwan Ahmed, Chandler, AZ (US); Lillian Lent, Gilbert, AZ (US)

(73) Assignee: Intel IP Corporation, Santa Clara, CA (US)

( * ) Notice: Subject to any disclaimer, the term of this patent is extended or adjusted under 35 U.S.C. 154(b) by 158 days.

(21) Appl. No.: 13/594,640

(22) Filed: Aug. 24, 2012

(65) Prior Publication Data

US 2014/0055218 A1 Feb. 27, 2014

(51) Int. Cl.
*H04B 1/40* (2006.01)

(52) U.S. Cl.
USPC ............ 455/77; 455/76; 455/103; 455/127.3; 455/553.1; 330/278

(58) Field of Classification Search
USPC ............... 455/76, 77, 102, 103, 127.1, 127.2, 455/127.3, 550.1, 552.1, 553.1; 330/254, 330/278, 305
See application file for complete search history.

(56) References Cited

U.S. PATENT DOCUMENTS

| 7,145,413 | B2 | 12/2006 | Hsu et al. |
| 7,356,325 | B2 | 4/2008 | Behzad et al. |
| 7,583,143 | B2 * | 9/2009 | Pan ............................... 330/254 |
| 8,040,164 | B2 | 10/2011 | Parameswaran et al. |
| 2004/0113724 | A1 | 6/2004 | Shen |
| 2010/0271122 | A1 * | 10/2010 | Masuda et al. ............... 330/144 |

FOREIGN PATENT DOCUMENTS

| DE | 102007016590 A1 | 7/2008 |
| DE | 102009019440 A1 | 11/2009 |

OTHER PUBLICATIONS

Broadcom Corp.: A compact and power efficient local oscillator generation and distribution system for complex multi radio systems, 2008 IEEE RFIC Symposium Digest, pp. 277-280, 2008.
Office Action received for German Patent Application No. DE102013109169.5, mailed on Sep. 18, 2014, 10 pages of German Office Action only.

* cited by examiner

*Primary Examiner* — Nhan Le
(74) *Attorney, Agent, or Firm* — Baker Botts L.L.P.

(57) ABSTRACT

A tunable wideband distribution circuit for transmitting a wireless signal over a transmission line is disclosed. The tunable wideband distribution circuit may include a programmable gain buffer, wherein the gain of the programmable gain buffer is based at least in part on a frequency of the wireless signal. The tunable wideband distribution circuit may also include a tuning element configured to modify an effective impedance of the transmission line based at least on the frequency of the wireless signal, wherein the tuning element is electrically coupled to the transmission line.

10 Claims, 3 Drawing Sheets

TUNABLE WIDEBAND DISTRIBUTION CIRCUIT

TECHNICAL FIELD

The present disclosure relates generally to wireless communication and, more particularly, to tunable wideband distribution circuits.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include signal amplifiers which receive a radio-frequency or other signal, amplify the signal by a predetermined gain, and communicate the amplified signal. On the other hand, a receiver is an electronic device which, also usually with the aid of an antenna, receives and processes a wireless electromagnetic signal. In certain instances, a transmitter and receiver may be combined into a single device called a transceiver.

A receiver in a wireless communication device that desires to transmit and/or receive over a range of frequency bands may employ a wideband distribution circuit to transmit a wireless signal from one part of the wireless communication device to another. Due to the different characteristics of the different frequency bands, the performance of the wireless communication device may change based on the selected frequency. In particular, due to the frequency-dependent nature of power losses in transmission lines, power transfer of a signal within the distribution circuit may be difficult if not impossible to optimize for a plurality of frequencies. Thus, for a wireless communication device that desires to transmit and/or receive over a range of frequency bands, what may be an optimal power transfer setup for one frequency may be suboptimal for another frequency.

SUMMARY

A tunable wideband distribution circuit for transmitting a wireless signal over a transmission line is disclosed. The tunable wideband distribution circuit may include a programmable gain buffer, wherein the gain of the programmable gain buffer is based at least in part on a frequency of the wireless signal. The tunable wideband distribution circuit may also include a tuning element configured to modify an effective impedance of the transmission line based at least on the frequency of the wireless signal, wherein the tuning element is electrically coupled to the transmission line.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
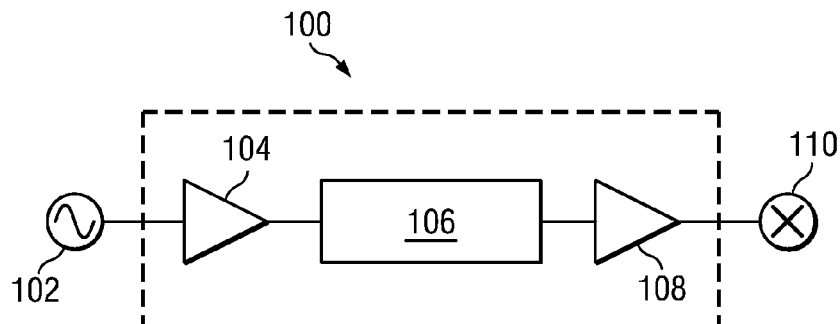
FIG. 1 illustrates a simplified block diagram of an example wireless signal driver, in accordance with certain embodiments of the present disclosure.

FIG. 1 illustrates a simplified block diagram of an example wireless signal driver 100, in accordance with certain embodiments of the present disclosure. For simplicity, wireless signal driver 100 is represented by frequency source 102, buffer driver 104, transmission line 106, buffer receiver 108, and load 110. In some embodiments, frequency source 102 may be any source of a radio frequency ("RF") signal to be transmitted as part of a wireless communication system. For example, wireless signal driver 100 may, in some embodiments, be a voltage-controlled oscillator implemented as part of a cellular communication system. In some embodiments, a wireless transmitter may be implemented as an integrated circuit ("IC") including a local oscillator ("LO"). In some configurations, the cellular communication system may require communicating over frequencies ranging from 700 to 2,690 MHz. In some embodiments, it may be necessary or desirable to operate efficiently at some or all of the frequencies within this range. For the example frequency range, a wireless communication system may require an on-chip LO operating at a signal frequency range of 2,800 to 5,380 MHz.

Additionally, in some embodiments, the LO signal may be distributed to many transmit/receive mixer blocks and/or one or more phase-locked loop synthesizer blocks. Depending on the configuration of the wireless communication system, these transmit receive mixer blocks and/or phase-locked loop synthesizer blocks may be far away (relative to the dimensions of the IC) from the LO source. As distance increases, the amount of power consumed to deliver an LO signal of appropriate amplitude correspondingly increases. For example, within the frequency range noted above, a distance over one nanometer greatly increases the amount of power required.

Referring again to FIG. 1, the example wireless signal driver illustrates a high-level diagram of an example embodiment. Frequency source 102 may, for example, deliver an LO signal of 2,800 MHz to buffer driver 104. In some embodiments, buffer driver 104 may amplify the signal provided by frequency source 102 before passing the signal through transmission line 106 to buffer receiver 108, as described in more detail below with reference to FIG. 2. As described in more detail above, transmission line 106 may be any appropriate transmission line between buffer driver 104 and buffer receiver 108. In some embodiments, transmission line 106 may be the IC path between the one or more circuit(s) of buffer driver 104 and the one or more circuit(s) of buffer receiver 108. Buffer receiver 108 may, in some embodiments, be configured to further process the signal received from buffer driver 104 via transmission line 106, as described in more detail below with reference to FIG. 2. For example, buffer receiver 108 may amplify the signal received, which may be lower in power due to transmission losses incurred in transit over transmission line 106. After processing, the signal may then pass to load 110. As described in more detail above, load 110 may be any appropriate load configured to receive the signal from frequency source 102. For example, load 110 may be one or more: mixer(s), multiplier(s), divider(s), multiplexor(s), receiver block(s), transmission block(s), and/or synthesizer block(s).

Figure 2:
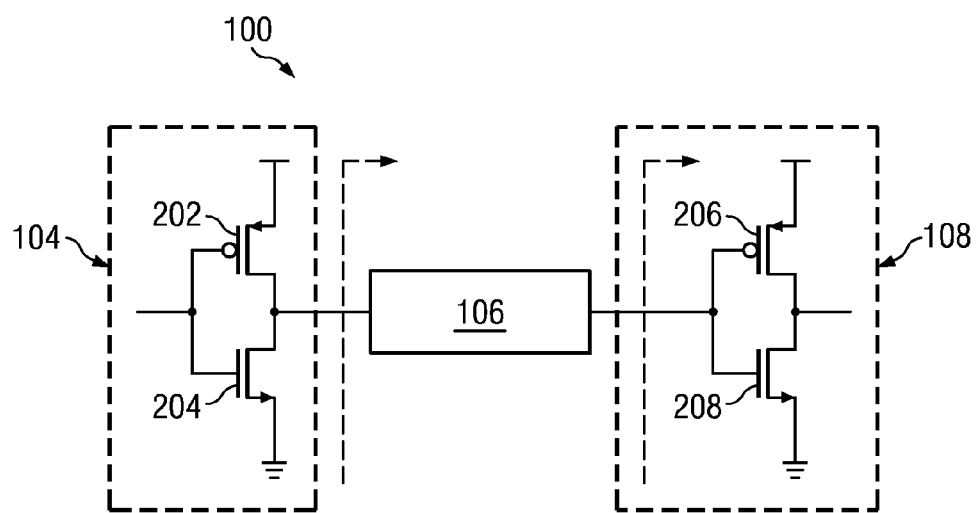
FIG. 2 illustrates a simplified circuit diagram of an example wireless signal driver, in accordance with certain embodiments of the present disclosure.

FIG. 2 illustrates a simplified circuit diagram of an example wireless signal driver 100, in accordance with certain embodiments of the present disclosure. In some embodiments, wireless signal driver 100 may include buffer driver 104, transmission line 106, and buffer receiver 108. For ease of illustration, elements 104, 108, 110 may correspond to elements 104, 108, 110 described in more detail above with reference to FIG. 1. For simplicity, wireless signal driver 100 is shown as receiving an input from a signal source such as frequency source 102 described in more detail above with reference to FIG. 1. Wireless signal driver 100 is also shown as outputting a signal such as the signal to load 110 described in more detail above with reference to FIG. 1.

Referring again to FIG. 2, in some embodiments, buffer driver 104 may include transistors 202, 204. As illustrated in FIG. 2, transistors 202, 204 may be CMOS transistors configured to act as an amplifier of the input signal. After amplifying the signal, buffer driver 104 may then pass the signal along transmission line 106 to buffer receiver 108. In some embodiments, buffer receiver 108 may include transistors 206, 208. As illustrated in FIG. 2, transistors 206, 208 may be CMOS transistors configured to act as an amplifier of the signal prior to output.

As described in more detail above with reference to FIG. 1, transmission of the signal over transmission line 106 may result in power losses that may impact the overall performance of the wireless communication system. As such, it may be necessary or important to provide a manner of amplifying the signal at a plurality of places along the transmission path in order to maximize performance. However, for configurations of the wireless transmission system that operate over a wide range of frequencies, it may be difficult to implement an amplification scheme appropriate for the entire range of frequencies. That is, a segment of wireless signal driver 100 may demonstrate different loss characteristics depending on the frequency of the input signal. This may be due at least in part to the dependence of the impedance value of that segment on the frequency of the input signal. It may be necessary or desirable to be able to vary the impedance of different segments of wireless signal driver 100 in order to optimize the power transfer of the input signal across wireless signal driver 100.

Figure 3:
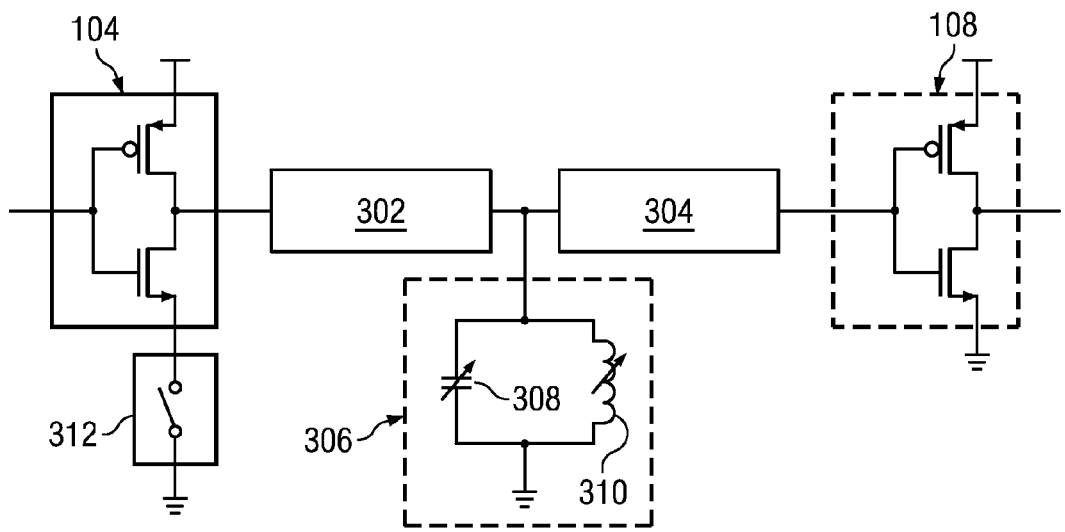
FIG. 3 illustrates a high-level circuit diagram of an example tunable wideband distribution circuit, in accordance with certain embodiments of the present disclosure.

FIG. 3 illustrates a high-level circuit diagram of an example tunable wideband distribution circuit 300, in accordance with certain embodiments of the present disclosure. As described in more detail above with reference to FIGS. 1-2, a wireless communication system may include a wireless signal driver that may, in some embodiments, include buffer driver 104, transmission line 106, and/or buffer receiver 108. In accordance with certain embodiments of the present disclosure, tunable wideband distribution circuit 300 may further include one or more switches 312, and tuning element 306. In some embodiments, transmission line 106 described in more detail above with reference to FIGS. 1-2 may be thought of as split into multiple segments. For example, in example tunable wideband distribution circuit 300 of FIG. 3, transmission line 106 may include one or more transmission line segments 302, 304. In some embodiments, transmission line segment 302 may be the portion of the transmission line between buffer driver 104 and tuner element 306, and transmission line segment 304 may be the portion of the transmission line between tuner element 306 and buffer receiver 108. Although two transmission line segments 302, 304 are depicted in FIG. 3, a plurality of transmission line segments may be included in any given implementation without departing from the scope of the present disclosure. Likewise, although only one each of buffer driver 104, tuning element 306, and buffer receiver 108 are depicted in FIG. 3, a particular implementation of tunable wideband distribution circuit 300 may require one or more of each element. A plurality of elements may therefore be present in any particular implementation without departing from the scope of the present disclosure.

In some embodiments, tunable wireless signal driver 300 may include one or more switches 312. Switch 312 may be used to enable certain segments of buffer driver 104. As described in more detail above with reference to FIG. 2, buffer driver 104 may include one or more segments. Each segment may be configured to amplify the frequency source signal by some amount. One or more switch(es) 312 may be configured to enable one or more of the segments of buffer driver 104, thereby modifying the amount of gain applied to the frequency source signal. Although one switch 312 is illustrated in FIG. 3, one or more switch(es) may be present with tunable wideband distribution circuit 300 without departing from the scope of the present disclosure.

When the appropriate number of segments of buffer driver 104 have been enabled by the appropriate number of switches 312, the input frequency source may be amplified by a necessary or desired amount. This amplified signal may then be passed over transmission line segment 302 before encountering tuning element 306. In some embodiments, tuning element 306 may be a combination of circuit elements configured to vary the impedance of the transmission line. As an illustrative example, tuning element 306 may include variable capacitor 308 and variable inductor 310. In other configurations, tuning element 306 may include only one tunable component or more than two components without departing from the scope of the present disclosure. For example, as described in more detail below with reference to FIG. 4, a tuning element may include an inductor and a variable capacitor.

Further, although depicted in FIG. 3 as being placed in the middle of the transmission line (breaking the transmission line into transmission line segments 302, 304), tuning element 306 may be included anywhere along the transmission line without departing from the scope of the present disclosure. Depending on the particular design configuration of tunable wideband distribution circuit 300, tuning element 306 may be placed at either end of the transmission line or at any appropriate place along the line. Considerations for placement may include performance characteristics such as desired current level, or physical characteristics of the wireless communication system such as space and/or form factor considerations. Other configurations may require other considerations.

In some embodiments, tuning element 306 may act to change the effective length of the transmission line. As described in more detail above with reference to FIG. 1, in wireless communication systems different frequencies see different performance levels for a given transmission line length. That is, in order for power transfer to be optimized, it may be necessary or desirable for a given frequency to have an optimized transmission line length. However, in wireless communication systems in which a wireless signal driver may be required to transmit and/or receive a wide range of frequencies, it is not always possible to adjust the physical length of the transmission line for each frequency band. As a result, some frequencies will see more efficient power transfer than others. In some embodiments, however, tuning element 306 may be configured so as to vary the amount of impedance in series with the transmission line, thereby altering the overall impedance of the transmission line. This may result in a longer or shorter effective length of the transmission line, as appropriate. For example, a higher frequency band may require a shorter effective transmission line length than a lower frequency band. As described in more detail below with reference to FIGS. 4-5, tuning element 306 may be configured with settings for multiple frequency bands required for a given wireless signal driver. When the wireless communication system wishes to transmit and/or receive at a particular frequency, it may notify tuning element 306. Tuning element 306 may then adjust the settings of its components in order to provide the appropriate impedance value associated with the identified frequency. In such a manner, the power transfer for a given frequency band may be optimized.

Figure 4:
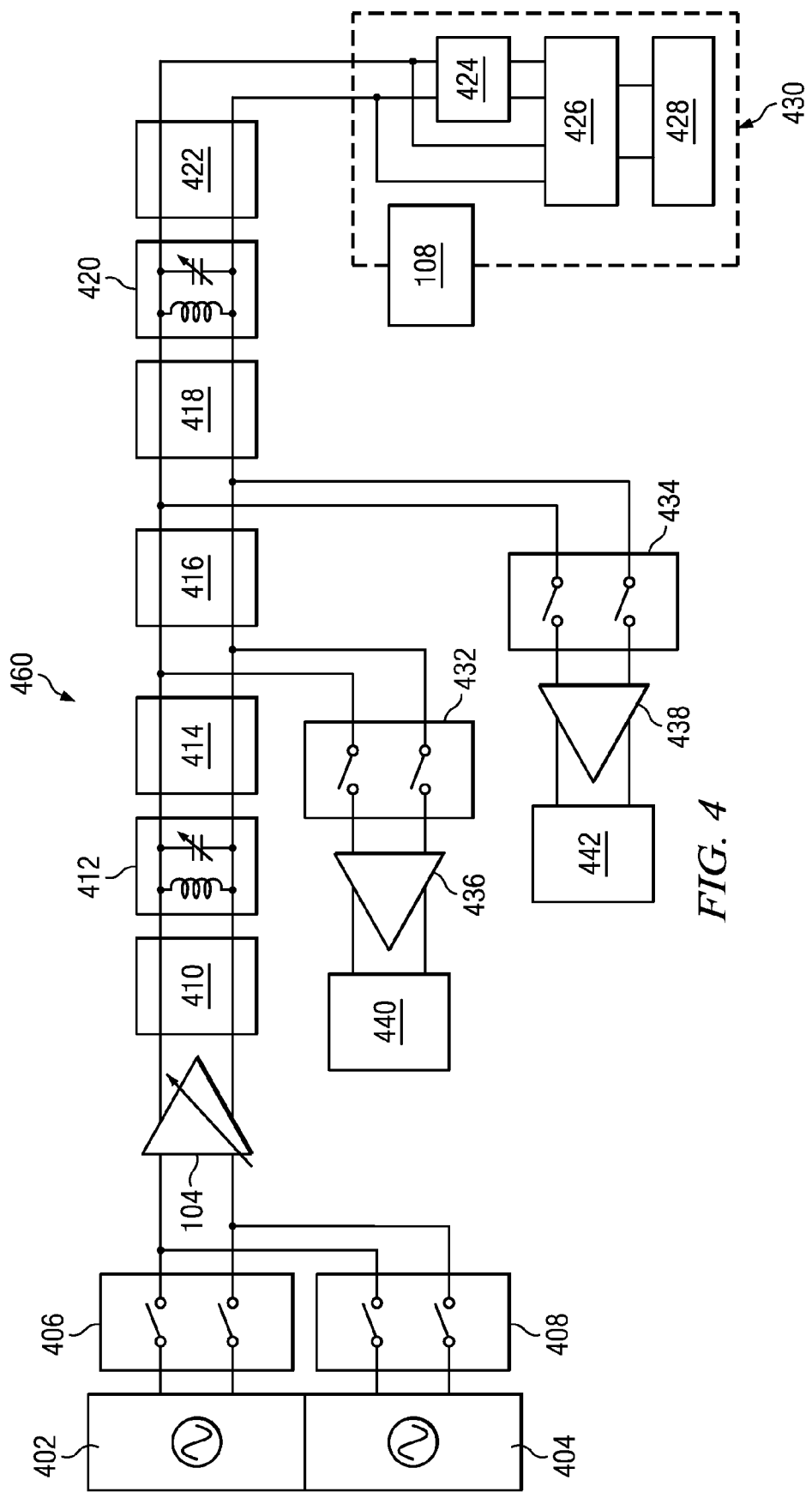
FIG. 4 illustrates a high-level circuit diagram of an example tunable wideband distribution circuit, in accordance with certain embodiments of the present disclosure.

FIG. 4 illustrates a high-level circuit diagram of an example tunable wideband distribution circuit 460, in accordance with certain embodiments of the present disclosure. In some embodiments, wireless signal driver 460 may include a plurality of input frequency sources. In the example illustrated, tunable wideband distribution circuit 460 includes frequency source 402, a voltage-controlled oscillator providing an input in the 2.6-4.1 GHz range, and frequency source 404, a voltage-controlled oscillator providing an input in the 3.6-5.6 GHz range. Frequency sources 402, 404 are provided as examples to aid in understanding and are not intended to limit the scope of the present disclosure. In some embodiments, tunable wideband distribution circuit 460 may include switches 406, 408. Switches 406, 408 may be electronically and/or mechanically controlled switches configured to pass the signal(s) of frequency sources 402, 404 respectively. For example, when activated, switch 406 may be configured to enable the signal from frequency source 402 to pass on to buffer driver 104. Similarly, when activated, switch 408 may be configured to enable the signal from frequency source 404 to pass on to buffer driver 104.

In some embodiments, tunable wideband distribution circuit 460 may also include one or more buffer driver(s) 104. As described in more detail above with reference to FIGS. 1-3, buffer driver(s) 104 may be an amplifier configured to amplify the signal input from frequency sources 402, 404. The amount of gain applied to the input signal may vary depending on the frequency of the input signal, as described in more detail above with reference to FIGS. 1-3. After being amplified, the signal may then be passed onto the transmission line In some embodiments—as described in more detail above with reference to FIG. 3—the transmission line associated with tunable wideband distribution circuit 460 may be considered as broken up into multiple transmission line segments when one or more tuning element(s) are introduced in the middle of the transmission line. In the illustrative example of FIG. 4, the transmission line is broken up into five transmission line segments 410, 414, 416, 418, 422. Depending on the particular configuration, the total length of the transmission line, as well as the placement of certain components may be driven by characteristics of the wireless communication system, as described in more detail above with reference to FIG. 3. In the illustrative example, the total transmission line length between buffer driver 104 and buffer receiver 108 is 6,100 µm. This distance may be larger or smaller for other configurations. Additionally, transmission line segments 410, 414, 416, 418, 422 are depicted as having lengths of 1,750 µm, 1,750 µm, 100 µm, 1,250 µm, and 1,250 µm, respectively. In other configurations, the number of transmission line segments (if any) may be larger or smaller, and the lengths of those segments may be larger and/or smaller than those illustrated.

In the example, transmission line segment 410 may be the portion of the transmission line between buffer driver 104 and tuning element 412. Transmission line segment 414 may be the portion of the transmission line between tuning element 412 and the point at which switch 432 intersects with the transmission line. Transmission line segment 416 may be the portion of the transmission line between tuning element the point at which switch 432 intersects with the transmission line and the point at which switch 434 intersects with the transmission line. Transmission line segment 418 may be the portion of the transmission line between the point at which switch 434 intersects with the transmission line and tuning element 420. Transmission line segment 422 may be the portion of the transmission line between tuning element 420 and buffer receiver 108.

In some embodiments, tunable wideband distribution circuit 460 may include a plurality of tuning elements, as described in more detail above with reference to FIG. 3. In the illustrative example, tunable wideband distribution circuit 460 includes two tuning elements 412, 420, each including an inductor and a variable capacitor. In some embodiments, a plurality of tuning elements may allow the designer of the wireless communication system greater flexibility in determining how best to tune tunable wideband distribution circuit 460. The inductor and variable capacitor of tuning elements 412, 420 may be any appropriate value necessary to tune the impedance value of the selected transmission line segment. For example, given the length of transmission line segments 410, 414, an appropriate value for the inductor of tuning element 412 may be 1.62 nH. As an additional example, given the length of transmission line segments 418, 422, an appropriate value for the variable capacitor of tuning element 420 may be 2.7 nH. The variable capacitor may, in some embodiments, be implemented as a plurality of variable capacitors. For example, the variable capacitor of tuning element 412 may be implemented as 16 variable capacitors with a maximum capacitance of 102 femtoFarads (denoted as 16×102 f). In the same or alternative embodiments, tuning element 412 may also include a secondary variable capacitor. As an illustrative example, this capacitor may have a value of 10×102 f. Similarly, an appropriate value for the variable capacitor of tuning element 420 may be 12×102 f. In the same or alternative embodiments, tuning element 420 may also include a secondary variable capacitor. As an illustrative example, this capacitor may have a value of 7×102 f.

In some embodiments, tunable wideband distribution circuit 460 may also include switches 432, 434. Switches 432, 434 may be configured to enable the output of the appropriate input signal. For example, switch 432 may be configured to enable the output of frequency source 402. Likewise, switch 434 may be configured to enable the output of frequency source 404. Following switches 432, 434 may be one or more output buffer(s) 436, 438. In some embodiments, it may be necessary or desirable to amplify the signal received at output buffers 436, 438. For example, in a wireless communication system comprising cellular communication, it may be necessary or desirable to amplify the output signal in order to maximize cellular data transmission. From output buffers 436, 438, the output signal may go to wireless network systems 440, 442. As an illustrative example, in the case of cellular transmission, the output signal may be configured to transmit data in a protocol compatible with second-generation cellular telecommunications networks ("2G"), third generation cellular telecommunications networks ("3G"), and/or long term evolution cellular telecommunications networks ("LTE").

In some embodiments, tunable wideband distribution circuit 460 may also include synthesizer element 430. In some configurations of tunable wideband distribution circuit 460, it may be necessary or desirable to include synthesizer element 430 in order to maintain desired performance levels of the wireless network system. In some embodiments, synthesizer element 430 may include buffer receiver 108, divider 424, multiplexer 426, and prescaler 428.

In operation, the designer of tunable wideband distribution circuit 460 may determine which frequency bands are important for optimization of tunable wideband distribution circuit 460. For example, it may be necessary or desirable to optimize tunable wideband distribution circuit 460 in the 3 GHz, 4 GHz, and 5 GHz bands. At each of these frequencies, the impedance of the transmission line within tunable wideband distribution circuit 460 may vary. As a result, power transfer may be suboptimal. By modeling the behavior of tunable wideband distribution circuit 460, settings for tuning elements 412, 420 may be determined. For example, tuning elements 412, 420 may have possible settings of 0, 5, 10, and 15. In this example, the settings correspond to the values corresponding to four binary numbers: 0000, 0101, 1010, and 1111, respectively. In this example, the binary numbers represent whether each of the four variable capacitors described in more detail above are enabled. So, for example, a setting of zero (0000) would mean that all four variable capacitors are turned off. Likewise, a setting of 15 (1111) would mean that all four variable capacitors are enabled. Although these four settings are illustrated, more, fewer, or different settings may be implemented in a given configuration without departing from the scope of the present disclosure.

As a result of the modeling, it may be determined that the 0 setting is most appropriate for the 3 GHz frequency band, the 5 setting is most appropriate for the 4 GHz frequency band, the 10 setting also provides good performance for the 4 GHz frequency band, and the 15 setting is the most appropriate for the 5 GHz band.

TABLE 1 below illustrates some example modeling values for the transmission line impedance at the various frequency bands using the various values for tuning elements 412, 420.

the desired frequency band and notify buffer driver 104 and/or tuning elements 412, 420 of the appropriate settings. In some embodiments, this procedure may be carried out via a lookup table stored in firmware of the processor.

In such a manner, buffer driver 104 and/or tuning elements 412, 420 may be tuned to the appropriate settings to optimize power transfer for a particular frequency band. This ability may also be applicable for any number of frequency bands appropriate for tunable wideband distribution circuit 460. Tunable wideband distribution circuit 460 may therefore be able to accommodate multiple frequency bands within the same LO circuit.

Figure 5:
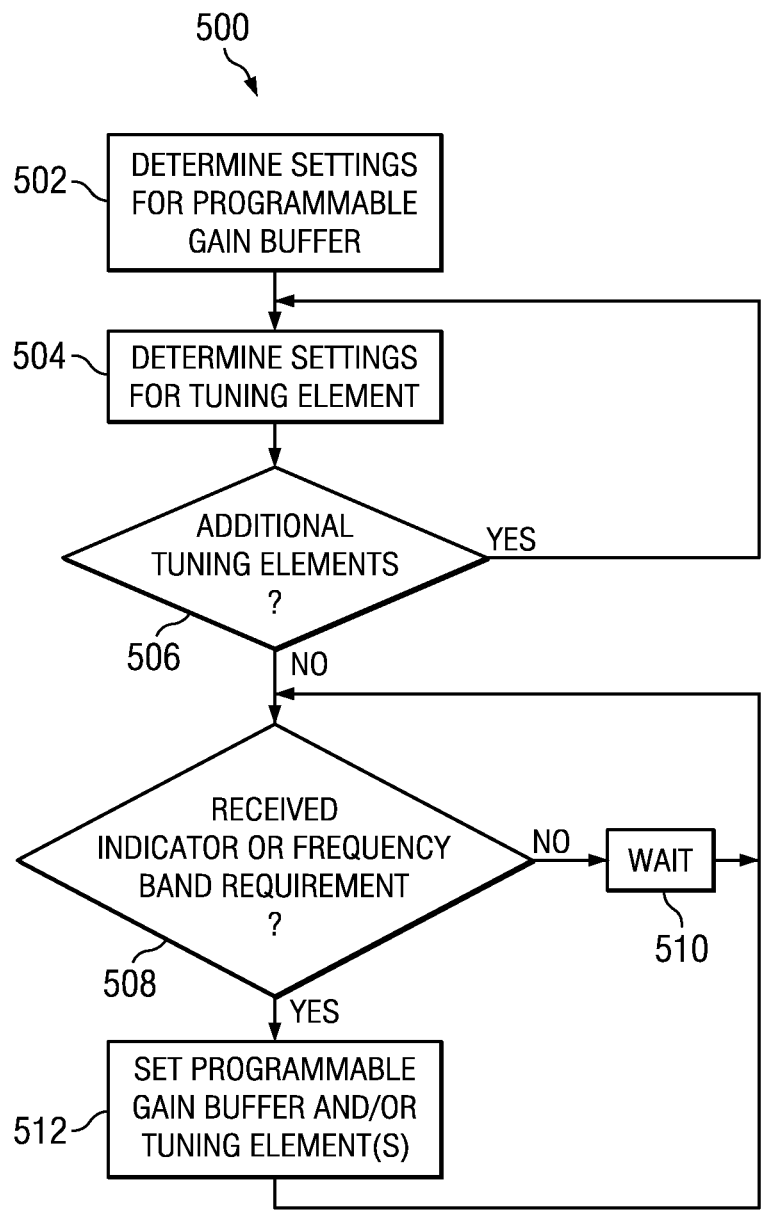
FIG. 5 illustrates a flowchart of an example method for setting the appropriate components of tunable wideband distribution circuit, in accordance with certain embodiments of the present disclosure.

FIG. 5 illustrates a flowchart of an example method 500 for setting the appropriate components of tunable wideband distribution circuit 460, in accordance with certain embodiments of the present disclosure. In some embodiments, method 500 may include steps 502-12. Although illustrated as discrete steps, various steps may be divided into additional steps, combined into fewer steps, or eliminated, depending on the desired implementation.

In some embodiments, method 500 may begin at step 502, in which the appropriate settings for a programmable gain buffer are determined. As described in more detail above with reference to FIGS. 1-4, the programmable gain buffer may be buffer driver 104. After determining the settings for the programmable gain buffer, method 500 may proceed to step 504. At step 504, method 500 may determine the settings for a first tuning elements. As described in more detail above with reference to FIG. 4, a first tuning element may be tuning element 412. Appropriate modeling of the behavior of tunable wireless signal driver 460 may result in a series of settings for tuning element 412 corresponding to a plurality of frequency bands, the operation at which is desired. After determining the settings for a first tuning element, method 500 may proceed to step 506.

At step 506, method 500 may determine whether there are additional tuning elements. If there are, method 500 may return to step 504. If not, method 500 may proceed to step 508. At step 508, method 500 may determine whether there has been some indication of the frequency band requirement. As described in more detail above with reference to FIG. 5, the programmable gain buffer and/or tuning elements may receive an indication of the appropriate settings, based at least on the desired frequency band. If no indication has been received, method 500 may proceed to step 510. At step 510, method 500 may wait a predetermined period of time before checking again for a frequency indicator. For example, in

TABLE 1

| Tuning Element Setting | Real Impedance - 3 GHz | Imaginary Impedance - 3 GHz | Real Impedance - 4 GHz | Imaginary Impedance - 4 GHz | Real Impedance - 5 GHz | Imaginary Impedance - 5 GHz |
|---|---|---|---|---|---|---|
| 0 | 94.9708 | 154.591 | 26.6933 | −3.7228 | 68.2366 | 40.4176 |
| 5 | 24.7851 | 89.5711 | 143.114 | −128.583 | 29.4246 | 13.2042 |
| 10 | 20.2406 | 79.3098 | 310.212 | 168.259 | 31.9059 | −16.0296 |
| 15 | 14.6138 | 62.7448 | 25.0461 | 106.733 | 127.135 | 238.232 |

After modeling the performance of tunable wideband distribution circuit 460, the wireless communication system may implement systems or methods for configuring buffer driver 104 and/or tuning elements 412, 420 at the appropriate settings for the desired frequency band. For example, in a cellular communication handset, a processor may identify that the handset is in range of a 3G network and therefore needs to transmit at a frequency appropriate for the network. The processor may then determine which settings are needed for some configuration it may be necessary or desirable to check frequently, i.e., every second. In other configurations, it may only be necessary or desirable to check intermittently, i.e., every 30 seconds. After waiting, method 500 may return to step 508.

If a frequency indicator has been received, method 500 may proceed to step 512. At step 512, method 500 may set the programmable gain buffer and/or tuning elements to the appropriate settings. After setting the elements appropriately, method 500 may return to step 508 in preparation for the possibility of a change in the frequency requirements.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. As an illustrative example, method 500 may further include determining whether there are additional programmable gain buffers that require setting. Although the present disclosure has been described in detail, it should be understood that various changes, substitutions, and alterations can be made hereto without departing from the spirit and the scope of the disclosure as defined by the appended claims.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could me made hereto without departing from the spirit and scope of the invention.

What is claimed is:

1. A tunable wideband distribution circuit for transmitting a signal over a transmission line, the tunable wideband distribution circuit comprising:
    a programmable gain buffer, wherein the gain of the programmable gain buffer is based at least in part on a frequency of the signal;
    a tuning element configured to modify an effective impedance of the transmission line based at least on the frequency of the signal, wherein the tuning element is electrically coupled to the transmission line; and
    a plurality of switches configured to select among a plurality of local oscillator signals, wherein the plurality of local oscillator signals provide signals at a plurality of frequency bands.

2. The tunable wide band distribution circuit of claim 1, wherein the plurality of frequency bands are in the radio frequency range.

3. The tunable wideband distribution circuit of claim 1, wherein the tuning element comprises a variable capacitor.

4. The tunable wide band distribution circuit of claim 1, wherein the tuning element comprises a variable inductor.

5. The tunable wide band distribution circuit of claim 1, wherein the effective impedance of the transmission line includes a nonzero reactance.

6. A wireless communication system comprising:
    a wireless baseband processor configured to operate at a plurality of radio frequencies;
    an antenna;
    a tunable wideband distribution circuit for transmitting a signal over a transmission line within the tunable wideband distribution circuit, the tunable wideband distribution circuit comprising:
        a programmable gain buffer, wherein the gain of the programmable gain buffer is based at least in part on a frequency of the signal;
        a tuning element configured to modify an effective impedance of the transmission line based at least on the frequency of the signal, wherein the tuning element is electrically coupled to the transmission line; and
        a plurality of switches configured to select among a plurality of local oscillator signals, wherein the plurality of local oscillator signals provide signals at a plurality of frequency bands.

7. The wireless communication system of claim 6, wherein the plurality of frequency bands are in the radio frequency range.

8. The wireless communication system of claim 6, wherein the tuning element comprises a variable capacitor.

9. The wireless communication system of claim 6, wherein the tuning element comprises a variable inductor.

10. The wireless communication system of claim 6, wherein the effective impedance of the transmission line includes a nonzero reactance.

* * * * *